United States Patent
Hagelqvist

(10) Patent No.: US 12,325,196 B2
(45) Date of Patent: Jun. 10, 2025

(54) EXPANSIBLE PLUNGER; AN ATTACHMENT UNIT AND A METHOD FOR ATTACHING A CONTAINER ELEMENT IN A CONTAINER BODY

(71) Applicant: AR Packaging Systems AB, Lund (SE)

(72) Inventor: Per Hagelqvist, Lund (SE)

(73) Assignee: GPI Systems AB, Lund (SE)

( * ) Notice: Subject to any disclaimer, the term of this patent is extended or adjusted under 35 U.S.C. 154(b) by 329 days.

(21) Appl. No.: 17/792,501

(22) PCT Filed: Dec. 14, 2020

(86) PCT No.: PCT/SE2020/051208
§ 371 (c)(1),
(2) Date: Jul. 13, 2022

(87) PCT Pub. No.: WO2021/145809
PCT Pub. Date: Jul. 22, 2021

(65) Prior Publication Data
US 2023/0058059 A1  Feb. 23, 2023

(30) Foreign Application Priority Data
Jan. 14, 2020  (SE) .................................. 2050017-9

(51) Int. Cl.
*B65B 51/14*  (2006.01)
*B29C 65/00*  (2006.01)
(Continued)

(52) U.S. Cl.
CPC ...... *B29C 66/8145* (2013.01); *B29C 66/5346* (2013.01); *B29L 2031/26* (2013.01); *B29L 2031/712* (2013.01)

(58) Field of Classification Search
CPC ... B29C 66/542; B29C 66/545; B29C 66/612; B29C 66/8145; B29C 66/8322;
(Continued)

(56) References Cited

U.S. PATENT DOCUMENTS 1,319,082 A * 10/1919 Hulbert .................. B31B 50/00
229/5.6
1,585,820 A   5/1926 Baum
(Continued)

FOREIGN PATENT DOCUMENTS

CA   2 493 682 A   1/2004
CN   1055152 A   10/1991
(Continued)

OTHER PUBLICATIONS

International Search Report for PCT/SE2020/051208 dated Feb. 12, 2021.
(Continued)

*Primary Examiner* — Tanzim Imam
*Assistant Examiner* — David G Shutty
(74) *Attorney, Agent, or Firm* — Womble Bond Dickinson (US) LLP

(57) ABSTRACT

A radially expansible press plunger including a base plate and a first plunger skirt. A circumferential edge portion of the first plunger skirt is arranged at a guiding surface of the base plate and being arranged radially inward of the circumferential edge of the bottom surface. The first plunger skirt is resiliently transformable between an unexpanded state and a radially expanded state. The expansible press plunger further comprises a second plunger skirt having a plunger skirt side wall with a circumferential edge portion at a bottom end of the second plunger skirt and being arranged radially outward of the circumferential edge portion of the first plunger skirt. The second plunger skirt is resiliently
(Continued)

transformable between an unexpanded state and a radially expanded state under influence from the circumferential edge portion of the first plunger skirt.

22 Claims, 4 Drawing Sheets

(51) Int. Cl.
*B65B 7/28* (2006.01)
*B29L 31/00* (2006.01)
*B29L 31/26* (2006.01)

(58) Field of Classification Search
CPC ........... B29C 66/81457; B29L 2031/26; B29L 2031/712; B31B 2105/0022
See application file for complete search history.

(56) References Cited

U.S. PATENT DOCUMENTS

| | | | |
|---|---|---|---|
| 2,085,879 A * | 7/1937 | Trump | B67B 3/14 |
| | | | 53/345 |
| 2,423,965 A * | 7/1947 | Coyle | B29C 66/612 |
| | | | 493/84 |
| 3,380,224 A | 4/1968 | Rousseau | |
| 3,668,824 A * | 6/1972 | Solomonov | B65B 7/285 |
| | | | 53/88 |
| 3,757,717 A * | 9/1973 | Bennett | B67B 7/00 |
| | | | 29/512 |
| 4,599,123 A * | 7/1986 | Christensson | B29C 66/9241 |
| | | | 229/5.8 |
| 4,621,481 A | 11/1986 | Magnusson | |
| 4,640,733 A * | 2/1987 | Bogren | B29C 66/8242 |
| | | | 53/328 |
| 4,724,654 A * | 2/1988 | Dahlin | B29C 66/8161 |
| | | | 53/361 |
| 4,989,349 A | 2/1991 | Berg et al. | |
| 4,989,394 A * | 2/1991 | Berg | B29C 66/8167 |
| | | | 53/361 |
| 5,392,967 A * | 2/1995 | Satomi | B65D 47/248 |
| | | | 222/509 |
| 5,566,529 A * | 10/1996 | Sireix | B65D 3/262 |
| | | | 53/449 |
| 5,913,798 A * | 6/1999 | Grabher | B65B 7/2878 |
| | | | 53/329.2 |
| 6,558,305 B1 * | 5/2003 | Haggman | B29C 66/81463 |
| | | | 493/107 |
| 9,546,009 B2 | 1/2017 | Hagelqvist et al. | |
| 9,815,579 B2 | 11/2017 | Larsson et al. | |
| 9,821,527 B2 | 11/2017 | Hagelqvist | |
| 9,850,021 B2 * | 12/2017 | Clougherty | B65D 3/04 |
| 10,315,377 B2 * | 6/2019 | Sireix | B31D 1/005 |
| 11,292,625 B2 | 4/2022 | Holka et al. | |
| 11,572,205 B2 * | 2/2023 | Horz | B65B 7/2807 |
| 2007/0246468 A1 | 10/2007 | Miller et al. | |
| 2019/0152631 A1 | 5/2019 | Sireix | |
| 2023/0382584 A1 * | 11/2023 | Hagelqvist | B29C 66/542 |

FOREIGN PATENT DOCUMENTS

| | | | | |
|---|---|---|---|---|
| CN | 101287673 A | 10/2008 | | |
| CN | 103200922 A | 7/2013 | | |
| CN | 107406172 A | 11/2017 | | |
| CN | 109476386 A | 3/2019 | | |
| CN | 110650891 A | 1/2020 | | |
| EP | 0 247 986 A1 | 12/1987 | | |
| EP | 0 370 979 A2 | 5/1990 | | |
| GB | 408223 A * | 4/1934 | | |
| GB | 767029 A * | 1/1957 | ............ | B65B 7/285 |
| GB | 832 379 A | 4/1960 | | |
| GB | 1032581 A * | 6/1966 | ............ | B65B 7/285 |
| JP | 62-287804 | 12/1987 | | |
| JP | 2-179726 | 7/1990 | | |
| JP | 9-509915 | 10/1997 | | |
| JP | 11-509810 | 8/1999 | | |
| JP | 2014-520732 | 8/2014 | | |
| SE | 8302841 | 5/1983 | | |
| SE | 8804230 | 11/1988 | | |
| SE | 1650512 A1 | 10/2017 | | |
| WO | WO 2013/009226 A1 | 1/2013 | | |
| WO | WO 2017/180056 A1 | 1/2017 | | |
| WO | WO-2018009128 A1 * | 1/2018 | ............ | B31B 50/81 |
| WO | WO-2018217156 A1 * | 11/2018 | ....... | B29C 66/81455 |

OTHER PUBLICATIONS

Notice of Reasons for Rejection for Japanese Application No. 2022-542996 dated Jun. 24, 2024, with English translation.
English translation of the Notification of the First Office Action for Chinese Application No. 202080092976X dated Oct. 9, 2023.

* cited by examiner

EXPANSIBLE PLUNGER; AN ATTACHMENT UNIT AND A METHOD FOR ATTACHING A CONTAINER ELEMENT IN A CONTAINER BODY

The present application is a national stage entry under 35 U.S.C. § 371 of International Patent Application No. PCT/SE2020/051208, filed on Dec. 14, 2020, which claims the benefit of Swedish Patent Application No. 2050017-9, filed on Jan. 14, 2020.

The disclosures of each of International Patent Application No. PCT/SE2020/051208, filed on Dec. 14, 2020, and Swedish Patent Application No. 2050017-9, filed on Jan. 14, 2020, are hereby incorporated by reference for all purposes as if presented herein in their entirety.

TECHNICAL FIELD

The present disclosure relates to a radially expansible press plunger, the press plunger comprising a base plate and a first plunger skirt. The base plate has a bottom surface with a circumferential edge defining a shape of the bottom surface. The base plate has a guiding surface opposite the bottom surface. The first plunger skirt has a circumferential edge portion at a bottom end of the first plunger skirt, the circumferential edge portion of the first plunger skirt being arranged at the guiding surface of the base plate and being arranged radially inward of the circumferential edge of the bottom surface. The first plunger skirt is resiliently transformable between an unexpanded state and a radially expanded state.

The disclosure also relates to an attachment unit for attaching a container sealing element in a container body and a method for sealing a packaging container using the attachment unit.

BACKGROUND

When packaging consumer goods, and in particular when packaging dry flowable consumer goods, it is common to use rigid paperboard packaging containers which serve as protective transport and storage containers at the retail end and as storage and dispensing containers at the consumer end. Such paperboard containers are usually provided with an openable and closable lid.

European patent publication EP 247 986 B1 discloses an expandable type lid welding piston comprising two piston parts; a formation part and an expansion part which are axially movable in relation to each other. The expansion part is operable to provide peripheral expansion of a section of the piston when the two parts are moved together, the expansion part comprising an expansion disc made of a deformable material and the formation part comprising a bottom plate having an upper surface supporting and guiding at least a part of the bottom surface of the expansion disc. The outer peripheral surface of the bottom plate is of the same shape as the outer peripheral edge of the expansion disc. The expansion disc is normally cup-shaped, and the bottom plate has at least the same size as the outer peripheral edge of the expansion disc in its normal, unexpanded condition. The formation and expansion parts are so arranged that axial movement of these parts towards one another results in flattening of the expansion disc from its cup-shape such that the outer peripheral edge thereof extends beyond the periphery of the bottom plate. The lid welding piston may be used as a part in an apparatus for producing packaging containers and serves to introduce and position an inner flexible lid in a container tube and to press an edge portion of the flexible lid against an inner wall of the container tube during a welding operation for attaching the inner flexible lid to the container wall. The lid welding piston is introduced into the container tube with the expansion disc in the unexpanded or normal state. When the flexible lid has been placed at the intended position inside the container tube, the piston parts are moved together, whereby the expansion disc is transformed to the expanded state with the peripheral edge of the expansion disc extending beyond the periphery of the bottom plate, thereby causing the expansion disc to press the edge portion of the flexible lid against the inner wall of the container tube.

U.S. Pat. No. 4,989,394 A discloses a device similar to the device in EP 247 986 B1. Hence, U.S. Pat. No. 4,989,394 A discloses a radially expansible press plunger comprising two main parts, i.e. a formation part and an expansion part which are movable in relation to each other. The expansion part is arranged to provide an expansion of at least some part of the press plunger when the main parts are moved together. The expansion part comprises a cup-formed expansion body and the formation part is designed with a formation surface against which at least parts of the expansion body is adapted to slide when the formation part and the expansion part are moved axially towards each other. The expansion part is composed of two different portions; an outer press portion for executing the actual radially outwards directed contact pressure of the press plunger and consisting of a wear resistant temperature resistant and elastic material; and an inner carrier portion of a relatively hard, elastic material, which carrier portion carries the press portion.

Document WO 2013/009226 A1 discloses an apparatus and a method for sealing a card-board based container. The apparatus comprises: a welding unit configured to fasten a lid to the container, which welding unit comprises an inductive welding energy generator for melting of a weldable layer that forms part of the container and/or the lid; and transporting means configured to transport a flow of containers to and from the welding unit. The transporting means comprises, in a container flow order, a feeding arrangement, a main conveyor member and a movable gripping arrangement, wherein the feeding arrangement is configured to transfer containers one by one in a continuous manner to the main conveyor member, wherein the movable gripping arrangement is configured to transfer containers from the main conveyor member to the welding unit, and wherein the apparatus is arranged in such a way that, during normal operation of the apparatus, the containers line up close to each other at an upstream side of the feeding arrangement, wherein the feeding arrangement is configured to, during operation, separate adjacent containers from each other in the direction of transport by increasing the feeding speed of each individual container along the feeding arrangement and thereby increasing the distance between adjacent containers fed along the feeding arrangement, wherein the main conveyor member is configured to operate at a transport speed that approximately corresponds to, and is uniform in relation to, a discharge speed of the containers when fed out from the feeding arrangement such that containers transferred to and along the main conveyor member remain separated, wherein the moveable gripping arrangement is configured to grip at least two containers and transfer these containers simultaneously from the main conveyor member to the welding unit, and wherein the welding unit is configured to simultaneously fasten a lid to each of the simultaneously transferred containers. Document WO 2013/009226 A1 also discloses a method for operating an apparatus of this type.

Although these previously known arrangements for applying a sealing member in a container have been found to be adequate for that purpose, there is still room for further improvement. An object of the present disclosure may therefore be to offer a more versatile expansible press plunger, which may be used to perform multiple process operations in a same process step. A further object of the present disclosure may be to offer an attachment unit allowing multiple process operations to be performed with one single attachment unit. Yet another object of the present disclosure may be to offer a method of performing more than one process operation in a single process step.

An overall object of the present disclosure is to overcome or ameliorate at least one of the disadvantages of the prior art, or to provide a useful alternative.

SUMMARY

One or more of the above objects may be achieved by the subject-matter of the independent claims 1, 17 and 20. Embodiments are set forth in the appended dependent claims, in the following description and in the drawings.

Disclosed herein is an expansible press plunger, the expansible press plunger extending in an axial direction and in a radial direction perpendicular to the axial direction, the expansible press plunger being expansible in the radial direction and comprising a base plate and a first plunger skirt, the base plate having a bottom surface with a circumferential edge defining a shape of the bottom surface, the base plate having a guiding surface opposite the bottom surface, the first plunger skirt having a top end and a bottom end and a circumferential edge portion at the bottom end of the first plunger skirt, the circumferential edge portion of the first plunger skirt being arranged at the guiding surface of the base plate, the first plunger skirt being resiliently transformable between an unexpanded state and a radially expanded state. The expansible press plunger comprises a second plunger skirt, the second plunger skirt having top end and a bottom end and comprising a plunger skirt side wall having an inner surface and an outer surface, the plunger skirt side wall extending from the top end to the bottom end of the second plunger skirt, the second plunger skirt side wall comprising a circumferential edge portion at the bottom end of the second plunger skirt, the circumferential edge portion of the second plunger skirt being arranged radially outward of the circumferential edge portion of the first plunger skirt, the second plunger skirt being resiliently transformable between an unexpanded state and a radially expanded state.

The circumferential edge portion of the first plunger skirt may be arranged radially inward of the circumferential edge of the bottom surface of the base plate when the first plunger skirt is in the radially unexpanded state.

The circumferential edge portion of the first plunger skirt may bear in the radial direction against the inner surface of the plunger skirt side wall at the circumferential edge portion of the second plunger skirt when the the first plunger skirt is in the radially unexpanded state or the circumferential edge portion of the first plunger skirt may be placed at a distance from the inner surface of the plunger skirt side wall at the circumferential edge portion of the second plunger skirt when the first plunger skirt is in the radially unexpanded state. The second plunger skirt is resiliently transformable between the unexpanded state and the radially expanded state under influence from the circumferential edge portion of the first plunger skirt which is arranged to bear against the inner surface of the plunger skirt side wall at the circumferential edge portion of the second plunger skirt at least during radial expansion of the first plunger skirt.

Transformation of the first plunger skirt from the unexpanded state to the radially expanded state is carried out by applying pressure on the top end of the first plunger skirt in the axial direction such that the first plunger skirt is exposed to a compressing force acting in the axial direction. The compressing force causes the circumferential edge portion of the first plunger skirt to be biased against the guiding surface of the base plate and to slide radially outward on the guiding surface of the base plate, thus radially expanding the first plunger skirt, i.e. increasing the circumference of the circumferential edge portion of the first plunger skirt. The guiding surface may be an inclined guiding surface, sloping radially downward toward the circumferential edge portion of the first plunger skirt. As the circumferential edge portion of the first plunger skirt moves radially outward on the guiding surface, the circumferential edge portion of the first plunger skirt acts on the inner wall of second plunger skirt with a force applied in the radial direction and causes the circumferential edge portion of the second plunger skirt to expand radially under influence of the pressure exerted by the circumferential edge portion of the first plunger skirt on the circumferential edge portion of the second plunger skirt.

The circumferential edge portion of the first plunger skirt may initially be positioned at the guiding surface of the base plate without actually being in contact with the guiding surface of the base plate. Accordingly, the circumferential edge portion of the first plunger skirt may be arranged above the guiding surface of the base plate in the axial direction. The circumferential edge portion of the first plunger skirt is then located at a small distance above the guiding surface of the base plate when the expansible press plunger is in an unexpanded state which may also be referred to as a rest position of the expansible press plunger when no expanding force is applied to the first plunger skirt. As the first plunger skirt is compressed in the radial direction when transferring to the expanded state, the circumferential edge portion of the first plunger skirt is pressed into contact with the guiding surface and moves radially along the guiding surface, to expand the circumferential edge portion of the first plunger skirt. Alternatively, the circumferential edge portion of the first plunger skirt may abut against the guiding surface of the base plate in the axial direction also when the expansible press plunger is in the rest position. The circumferential edge portion of the first plunger skirt may abut against the guiding surface of the base plate along all or part of the circumferential edge portion of the first plunger skirt.

The first plunger skirt may have the shape of a truncated cone or pyramid with side walls tapering towards the center of the first plunger skirt, while the second plunger skirt may have a cup shape with side walls extending generally parallel with the axial direction.

The second plunger skirt may have an expansion slit arranged in the plunger skirt side wall, the expansion slit extending in the plunger skirt side wall in the axial direction. The expansion slit facilitates radial expansion of the second plunger skirt and may be arranged all the way from the top end of the second plunger skirt to the bottom end of the second plunger skirt or only in a selected part of the wall of the second plunger skirt between the top end and the bottom end. The expansion slit may be arranged such that it does not cut through the circumferential edge portion of the second plunger skirt.

The second plunger skirt has a height in the axial direction, and the expansion slit may extend in the plunger skirt side wall a distance in the range of from 40% to 100% of the height of the second plunger skirt.

The plunger skirt side wall of the second plunger skirt may comprise a plurality of the expansion slits being arranged in the plunger skirt side wall. In a second plunger skirt constituted by a plurality of side wall portions which are interconnected by corner portions, one or more slits may be arranged in the corner portions, such as two slits, three slits or four slits in each corner portion of the second plunger skirt side wall. The slits may be arranged only in the corner portions of the second plunger skirt side wall or both in the corner portions and in the side wall portions between the corner portions of the second plunger skirt side wall. The number of side wall portions and corner portions of the second plunger skirt side wall may be any useful number, such as three, four, five, six, seven or eight side wall portions and corner portions.

The base plate of the expansible press plunger as disclosed herein may comprise a deformation control member, the deformation control member being arranged to counteract radially inward deformation of the circumferential edge portion of the second plunger skirt. Accordingly, the deformation control member is arranged to restrict radial inward movement of the circumferential edge portion of the second plunger skirt.

The deformation control member may take the form of a track arranged in the guiding surface of the base plate and, the track being inset from the circumferential edge of the bottom surface of the base plate and extending along a periphery of the guiding surface of the base plate. The track is open radially outward, to permit the circumferential edge portion of the second plunger skirt to expand and move radially outward. The radially inner side of the track is constituted by a wall which prevents the circumferential edge portion of the second plunger skirt to be pressed radially inward.

The second plunger skirt may comprise a sealing ridge extending circumferentially on an outer surface of the second plunger skirt side wall along all or part of a circumference of the second plunger skirt side wall.

The second plunger skirt may comprise a deformation tool, the deformation tool protruding radially from the outer surface of the second plunger skirt side wall. The deformation tool may comprise or consists of an elongated bulge extending in a circumferential direction of the second plunger skirt side wall, the elongated bulge extending over all or part of a circumference of the second plunger skirt side wall.

The deformation tool may e.g. be arranged for forming mating locking bulges in a closure arrangement in a packaging container, such as a packaging container as disclosed in WO 2017/180056 A1. WO 2017/180056 A1 discloses a paperboard packaging container for bulk solids. The paperboard packaging container comprises a tubular paperboard container body, a container bottom and a container lid. The container body extends in a longitudinal direction of the packaging container from a bottom end of the container body to a container opening. The container body comprises a container body abutment edge at the container opening. The container body has an inner surface facing towards an inner compartment in the packaging container and an outer surface facing away from the inner compartment. The container lid comprises a lid collar having an abutment edge adapted for abutting against the container body abutment edge, and a lid plug-in portion. The lid plug-in portion has a side surface extending in the longitudinal direction and facing the inner surface of the container body, when the container lid is in a closed position. The lid plug-in portion further comprises a main surface being located at a distance from the container body abutment edge when the container lid is in a closed position. The lid collar is made of the same material as the container body and the lid collar is delimited from the container body by a slit or by weakening means extending along the container body periphery for allowing the lid collar to be fully or partially separated from the container body at the abutment edges. The shape of the container opening is stabilized, either by (i) the paperboard packaging container comprising a partially removable transport closure attached to an inner surface of the container body and forming a roof over the inner compartment and/or (ii) by the container body comprising a multi-ply paperboard material including one or more layers of a polymeric film, a coating layer and/or metal foil. The paperboard packaging container is furthermore provided with a locking arrangement for retaining the container lid in the closed position. The locking arrangement comprises a first locking element in the form of a recess, provided on the inner surface of the container body, and a second locking element in the form of a protrusion, provided on the side surface of the lid plug-in portion, the first and second locking elements being mating locking elements. The first and second locking elements are arranged such that when the container lid is in the closed position the protrusion is in engagement with the recess.

The container lid and the plug-in portion of the paperboard packaging container are co-formed in the manufacturing procedure from one paperboard material sheet. The lid collar thus forms a contiguous continuation of the container body wall and the plug-in portion has the function of a plug, fitting tightly in the container opening in close contact with the inner surface of the container body. The interlocking locking elements of the locking arrangement assure that the container remains closed after closing. Closing the container requires a user to push the plug-in portion of the lid downwards in a fairly determined and forceful manner in order to overcome the resistance created as the protrusion of the second locking element is moved past the edges of the container wall. Accordingly, the abutment edge of the top member will hit the container body abutment edge with an increased force and thereby provide the consumer with an enhanced closure indication, such as a sensory snap-in indication and the audible signal e.g. in the form of a click sound, signalling to the user that the container is properly closed, which improves the user-experience with regards to the perception of a properly sealed container.

The container lid may be closed by pressing the plug-in portion into the container opening until the protrusion snaps into the recess and the lid collar abutment edge is closed against the container body abutment edge, which may be indicated to the user by a feeling of a slight resistance having to be overcome when pressing the lid in place, a snap-in or slide-in sensation and/or an audible signal such as a click sound or a squeaking or scratching sound being produced when the lid is closed on the container body. It may be generally preferred that a closure indication is provided as distinct sensation or sound, or a combination of a distinct sensation or sound as such signals may be perceived as providing a more definitive confirmation of a proper closing than an indistinct sensation or sound. Examples of distinct sensations are snap-in sensations while click or pop sounds may provide distinct sound sensations.

The circumferential edge portion of the second plunger skirt side wall may comprise or consist of the deformation tool. Hence, the circumferential edge portion may constitute a deformation tool.

The sealing ridge may be arranged above the deformation tool as seen in the axial direction from the bottom end of the second plunger skirt towards the top end of the second plunger skirt.

An expansible press plunger as disclosed herein, wherein the second plunger skirt comprises both a sealing ridge and a deformation tool may be used to apply an inner sealing member and to form interengaging locking elements in a locking arrangement, e.g. as disclosed in WO 2017/180056 A1. Thus, applying the inner sealing member and welding it to the inner wall of a container body tube and forming a locking arrangement may be performed in a same process operation when manufacturing the packaging container. Application of the inner sealing member and forming a locking arrangement may take place simultaneously or sequentially. If carried out sequentially, the application of the inner sealing member and the forming of a locking arrangement may take place with or without an overlap in time. It is also conceivable that the duration of the application of the inner sealing member and the forming of a locking arrangement differ. For instance, it may require a longer process time to properly set the packaging material in the deformed configuration within the area of the locking arrangement.

In an expansible press plunger as disclosed herein, the circumferential edge portion of the first plunger skirt may comprise a first circumferential edge portion segment and a second circumferential edge portion segment, a radial distance between the circumferential edge portion of the first plunger skirt in the unexpanded state and the circumferential edge portion of the first plunger skirt in the expanded state being different between the first circumferential edge portion segment and the second circumferential edge portion segment. The circumferential edge portion of the first plunger skirt may comprise at least two circumferential edge portion segments having different expansibility such that the shape of the circumferential edge portion of the first plunger skirt in the expanded state differs from the shape of the circumferential edge portion of the first plunger skirt in the unexpanded state to different degrees in the different circumferential edge portion segments. Thus, different segments of the circumferential edge portion of the first plunger skirt may be arranged to move radially outward to different extents as the first plunger skirt is transformed from the unexpanded state to the expanded state.

Accordingly, the circumferential edge portion of the first plunger skirt in the expanded state will differ not only in length but also in shape from the circumferential edge portion of the first plunger skirt in the unexpanded state.

In an expansible press plunger as disclosed herein, the circumferential edge portion of the first plunger skirt in the unexpanded state may be divided into a plurality of side portions being connected by corner portions at least one side portion of the circumferential edge portion of the first plunger skirt comprising a radially inwardly curved segment. The circumferential edge of the bottom surface of the base plate comprises a corresponding plurality of side portions being connected by corner portions. Although not necessary, a corresponding at least one of the side portions of the circumferential edge of the bottom surface of the base plate may comprise a radially inwardly curved segment corresponding to the at least one radially inwardly curved segment of the first plunger skirt. In case the base plate has a radially inwardly curved segment, the radius of curvature may be the same or larger than the radius of curvature of the first plunger skirt.

The expansible press plunger as disclosed herein may comprise a first piston and a second piston, the first piston and the second piston extending in the axial direction with the second piston being coaxial with the first piston, the base plate being connected to the first piston with the bottom surface of the base plate extending perpendicular to the axial direction, the first plunger skirt being connected to the second piston and the second plunger skirt being connected to the first piston, the first piston and the second piston being arranged to be simultaneously movable in the axial direction as a unit and to be independently movable in relation to each other in the axial direction.

Disclosed herein is also an attachment unit for attaching a container sealing element to a container body, the attachment unit comprising an expansible press plunger as disclosed herein and a retaining device, the retaining device being adapted to retain the container body, the retaining device comprising at least one through-going positioning cavity being adapted to receive and hold a portion of the container body, the positioning cavity of the retaining device having a cross-sectional area defining a footprint area of the container body, the expansible press plunger being axially movable between an attachment position inside the positioning cavity of the retaining device and a rest position outside the positioning cavity of the retaining device.

The retaining device may comprise a welding unit, such as a welding unit comprising an induction coil, the welding unit preferably being arranged around the positioning cavity.

The positioning cavity of the retaining device may comprise an indentation being arranged in a wall of the positioning cavity, the indentation corresponding to a deformation tool protruding radially from the outer surface of the second plunger skirt side wall, the deformation tool being arranged to nest inside the indentation when the expansible press plunger is in the attachment position. The outer surface of the second plunger skirt side wall may comprise a single deformation tool or multiple deformation tools with the positioning cavity comprising a single indentation or multiple indentations matching the deformation tool or tools on the outer surface of the second plunger skirt side wall. The cooperating deformation tool and indentation may be used to create any desired shape of a deformation in a container wall such as elongated ridges/grooves, discrete protrusions/depressions, etc.

The cross-sectional area of the positioning cavity may comprise a plurality of side portions being connected by corner portions, the bottom surface of the base plate and the circumferential edge portion of the first plunger skirt in the unexpanded state each comprising a plurality of corresponding side portions being connected by corner portions.

Disclosed herein is also a method for sealing a packaging container using the attachment unit as disclosed herein. The method comprises:
  placing a container body in the positioning cavity of the retaining device with a body wall of the container body being aligned with a wall of the positioning cavity;
  applying a container sealing element to the foot print surface of the base plate, the container sealing element comprising an attachment border extending radially outward of the circumferential edge of the bottom surface of the base plate;
  moving the container sealing element in the axial direction (A) of the attachment unit to an attachment position within the container body by means of the attachment unit and simultaneously flexing the attachment border of the container sealing element into alignment with the body wall of the container body;

transforming the first plunger skirt to the radially expanded state by pressing the first plunger skirt against the guiding surface of the bottom plate, thereby causing the circumferential edge portion of the first plunger skirt to move radially outward and to exert radial pressure on the second plunger skirt side wall, whereby the second plunger skirt is transformed from the unexpanded state to the radially expanded state and the attachment border of the container sealing element is pressed by the radially expanded second plunger skirt in a direction towards the body wall of the container body welding the attachment border of the container sealing element to the body wall of the container body.

The attachment border of the container sealing element may be pressed against the body wall of the container body by a sealing ridge arranged on the second plunger skirt, the sealing ridge extending circumferentially on the outer surface of the plunger skirt side wall along the circumference of the plunger skirt side wall of the second plunger skirt. Welding the attachment border of the container sealing element to the body wall of the container body is performed along the sealing ridge. The sealing ridge is preferably arranged such that it extends around the full circumference of the plunger skirt side wall.

The second plunger skirt may comprise a deformation tool protruding radially from the outer surface of the plunger skirt side wall, the positioning cavity of the retaining device comprising a corresponding indentation being arranged in a wall of the positioning cavity, the method further comprising the step of deforming the attachment border of the container sealing element and the body wall of the container body by radially pressing the deformation tool into the indentation in the wall of the positioning cavity. This process step may produce a locking arrangement as disclosed herein or may be a way to provide a container wall with a shape deviating from the original planar shape of the packaging material.

In the method as disclosed herein, a plurality of container sealing elements may be simultaneously positioned into a plurality of container bodies by a plurality of attachment units.

BRIEF DESCRIPTION OF THE DRAWINGS

The present invention will hereinafter be further explained by means of non-limiting examples with reference to the appended drawings wherein.

DETAILED DESCRIPTION

Figure 1:
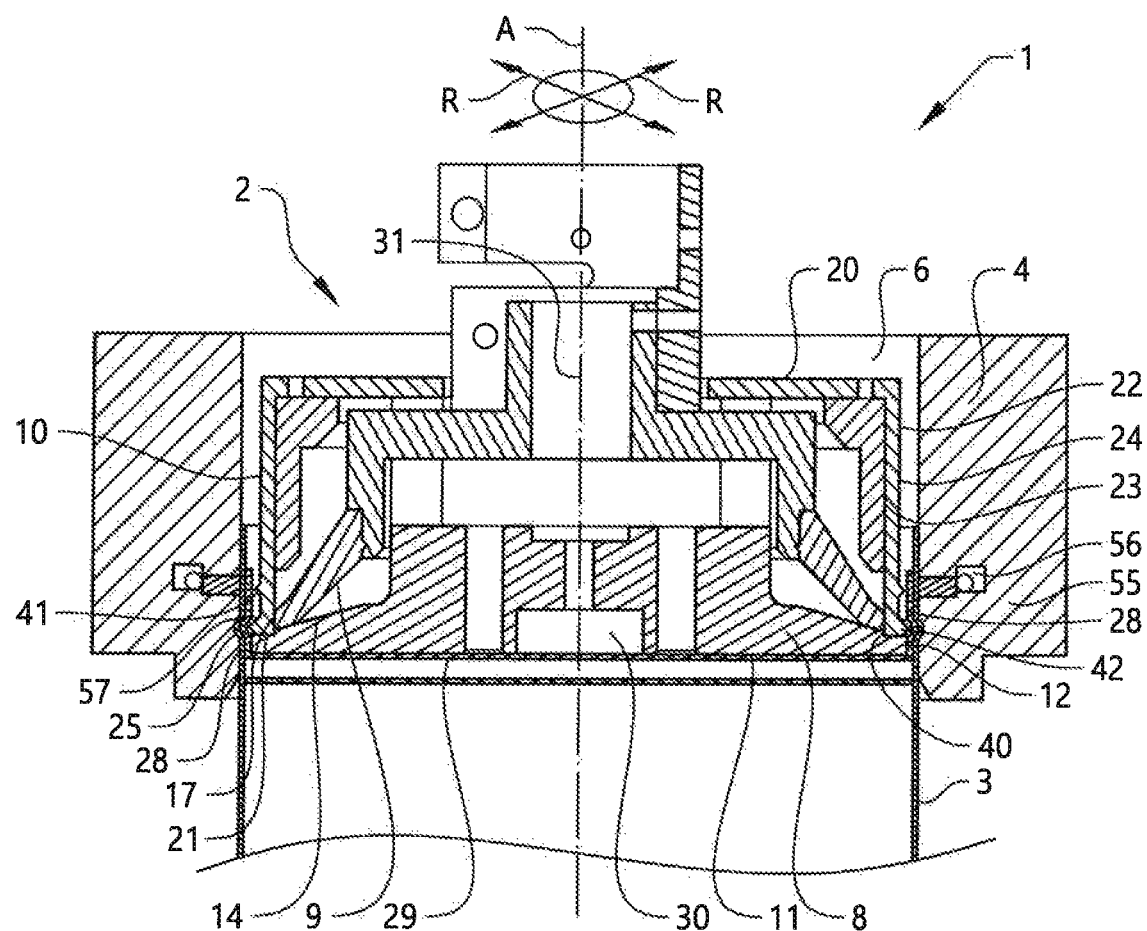
FIG. 1 shows a cross sectional view of an attachment unit.

With reference to FIG. 1, there is shown an attachment unit 1 for attaching a container sealing element 29 to a container body 3. The attachment unit 1 comprises an expansible press plunger 2 according to any one of the preceding claims and a retaining device 4 comprising at least one through-going positioning cavity 6. The positioning cavity 6 is adapted to receive and hold a portion of the container body 3 in position during processing of the container body 3 in the attachment unit 1. The positioning cavity 6 of the retaining device 4 has a cross-sectional area which defines a footprint area of the container body 3.

The expansible press plunger 2 is axially movable between an attachment position inside the positioning cavity 6 of the retaining device 4 and a rest position outside the positioning cavity 6 of the retaining device 4. FIG. 1 shows the attachment unit 1 with the expansible press plunger 2 inserted into the positioning cavity 6 after having returned from an expanded state and before being removed from the positioning cavity 6 after completion of a welding and container wall deformation operation.

The expansible press plunger 2 has an extension in an axial direction A and in a radial direction R perpendicular to the axial direction. The expansible press plunger 2 is expansible in the radial direction R under influence of a compressive force being applied in the axial direction A.

Figure 2:
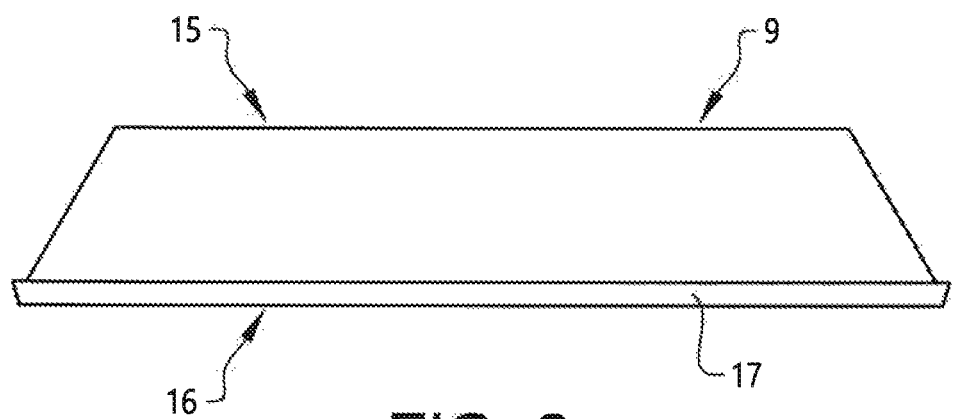
FIG. 2 shows a side view of the first plunger skirt in the attachment unit in FIG. 1.

The expansible press plunger 2 comprises a base plate 8, a first plunger skirt 9 and a second plunger skirt 10. The base plate 8 has a bottom surface 11 with a circumferential edge 12 defining a shape of the bottom surface 11 and a guiding surface 14 opposite the bottom surface 11. The first plunger skirt 9 has a top end 15 and a bottom end 16 and a circumferential edge portion 17 at the bottom end 16, as shown in FIG. 2. The circumferential edge portion 17 of the first plunger skirt 9 is arranged at the guiding surface 14 of the base plate 8. The first plunger skirt 9 is resiliently transformable between an unexpanded state and a radially expanded state by application of a compressive force to the top end 15 of the first plunger skirt 9. By resiliently transformable as used herein is implied that the first plunger skirt 9 automatically moves back to the uncompressed and unexpanded state when the compressive force is removed. The circumferential edge portion 17 of the first plunger skirt 9 is arranged radially inward of the circumferential edge 12 of the bottom surface 11 of the base plate 8 when the first plunger skirt 9 is in the unexpanded state.

Figure 4:
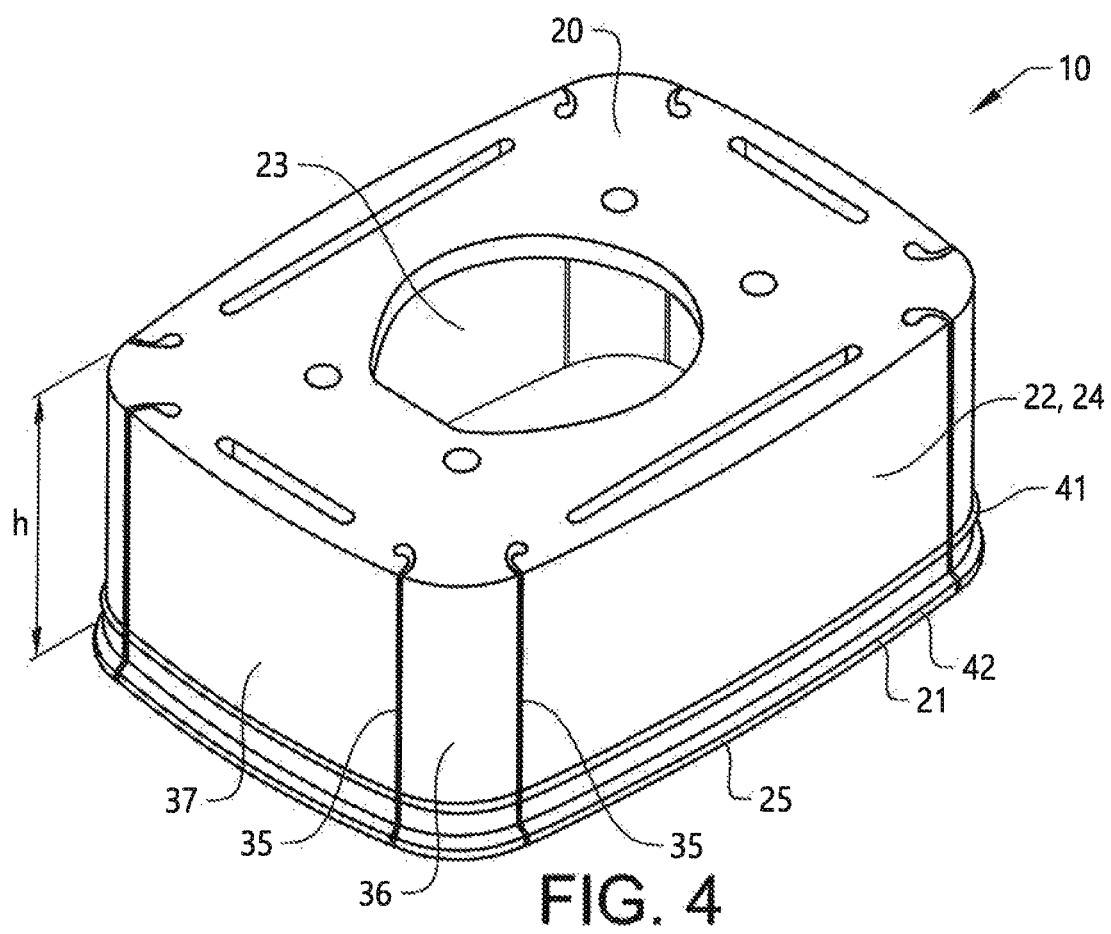
FIG. 4 shows a perspective view of the second plunger skirt in the attachment unit in FIG. 1.

The second plunger skirt 10 has top end 20 and a bottom end 21, a plunger skirt side wall 22 having an inner surface 23 and an outer surface 24. The plunger skirt side wall 22 extends from the top end 20 to the bottom end 21 of the second plunger skirt 10. As best seen in FIG. 4, the second plunger skirt side wall 22 comprises a circumferential edge portion 25 at the bottom end 21 of the second plunger skirt 10. The circumferential edge portion 25 of the second plunger skirt 10 is arranged radially outward of the circumferential edge portion 17 of the first plunger skirt 9. In the unexpanded state of the first plunger skirt 9, the circumferential edge portion 17 of the first plunger skirt 9 may bear against the inner surface 23 of the plunger skirt side wall 22 at the circumferential edge portion 25 of the second plunger skirt 10, as shown in FIG. 1. Alternatively, the circumferential edge portion 17 may be placed at a distance from the inner surface 23 of the plunger skirt side wall 22 at the circumferential edge portion 25 of the second plunger skirt when the first plunger skirt 9 is in the unexpanded state. As the first plunger skirt 9 is axially compressed and expands in the radial direction R, the circumferential edge portion 17 of the first plunger skirt 9 is biased against the inner surface 23 of the plunger skirt side wall 22 and presses the side wall 22 of the second plunger skirt 10 outward in the radial direction R, thereby causing expansion of the second plunger skirt 10. The second plunger skirt 10 is resiliently transformable between the unexpanded state and the radially expanded state. Hence, the second plunger skirt 10 automatically moves back to the unexpanded state when the radial force exerted by the first plunger skirt 9 on the inner surface 23 of the second plunger skirt side wall 22 is removed.

The expansible press plunger 2 comprises a first piston 30 and a second piston 31, both extending in the axial direction A with the second piston 31 being coaxial with the first piston 30. The base plate 8 is connected to the first piston 30 with the bottom surface 11 of the base plate 8 extending perpendicular to the axial direction A. The first plunger skirt 9 is connected to the second piston 31 and the second plunger skirt 10 is connected to the first piston 30. The first and second pistons 30, 31 are arranged to be moved simultaneously as a single unit in the axial direction A as well as being independently movable in relation to each other.

The first plunger skirt 9 is transferred to the expanded state by means of a relative displacement between the first piston 30 and the second piston 31 such that the first plunger skirt 9 is pressed down on the guiding surface 14 of the base plate 8 and the first plunger skirt 9 is compressed such that the distance between the top end 15 and the bottom end 16 of the first plunger skirt 9 is diminished and the circumferential edge portion 17 of the first plunger skirt 9 is urged radially outward. As set out herein, different segments of the circumferential edge portion 17 of the first plunger skirt 9 may be configured to move radially outward to different extents such that not only will the length of the circumferential edge portion 17 be greater in the expanded state but the shape, i.e. the outline of the circumferential edge portion 17 will differ between the expanded and unexpanded states.

When the first plunger skirt 9 has reached its fully expanded state, also the second plunger skirt 10 has been fully expanded.

During this process, the circumferential edge portion 17 of the first plunger skirt 9 slides radially outward on the guiding surface 14 of the base plate 8. In the attachment unit 1 which is shown in FIG. 1, the guiding surface 14 is inclined in a downward and outward direction which contributes to obtaining a controlled deformation of the first plunger skirt 9 during transformation to and from the expanded state. Depending on the shape of the first plunger skirt 9, the degree of radial expansion may be different within different portions of the first plunger skirt.

The circumferential edge portion 17 of the first plunger skirt 9 may abut against the guiding surface 14 of the base plate 8 also when the expansible press plunger 2 is in the unexpanded state shown in FIG. 1. Alternatively, the circumferential edge portion 17 of the first plunger skirt may be arranged at a distance above the guiding surface 14 of the base plate 8 when the expansible press plunger 2 is in the unexpanded state.

The attachment unit 1 which is shown in the figures is configured for forming packaging containers having a modified rectangular cross-sectional area, also referred to herein as the footprint area of a packaging container. This means that the first and second plunger skirts 9, 10, the bottom surface 11 of the base plate 8 and the cross-sectional area of the positioning cavity each also has a modified rectangular cross-sectional area with side wall portions which are interconnected by corner portions. It is to be understood that the modified rectangular shape shown in the Figures is provided only as a non-limiting example of a useful shape and that other cross-sectional or footprint shapes are conceivable such as circular, oval, or any useful modified polygonal shape. As used herein a modified polygonal shape, such as a modified rectangular shape implies a shape having side portions connected by rounded corner portions. The side portions may be straight or may have a curvature which is less than a curvature of the corner portions.

As seen in FIG. 4, two expansion slits 35 are arranged in the plunger skirt side wall 22 of the second plunger skirt 10 at each corner portion 36 of the second plunger skirt 10. The expansion slits 35 are arranged in the plunger skirt side wall 22 between the top end 20 of the second plunger skirt 10 and the bottom end 21 of the second plunger skirt 10. In the example shown in FIG. 4, the expansion slits 35 extend all the way from the top end 20 to the bottom end 21 of the second plunger skirt 10 and are even shown to extend into the top of the second plunger skirt 10. This is arrangement of the expansion slits 35 is not a prerequisite of the expansible press plunger 2 as disclosed herein. Hence, the expansion slits may extend in the plunger skirt side wall 22 a distance in the range of from 40% to 100% of the height h of the second plunger skirt 10 as measured between the top end 20 and the bottom end 21 of the second plunger skirt 10.

One or more expansion slits 35 may be arranged such that they terminate at a distance from the bottom end 21 of the second plunger skirt 10 without cutting through the circumferential edge portion 25 of the second plunger skirt 10. Furthermore, the number of expansion slits may be less or more than the eight expansion slits 35 shown in FIG. 4. The disposition of the expansion slits may be different than that shown in FIG. 4, with one or more expansion slits arranged in the side wall portions 37. The second plunger skirt may comprise expansion slits arranged only in corner portions, only in side wall portions or in both corner portions and side wall portions. In a second plunger skirt having a shape with side wall portions connected by corner portions, it is generally preferred that expansion slits are arranged at least in the corner portions. Furthermore, if a plurality of expansion slits 35 are arranged in the plunger skirt side wall 22, the slits may differ in length and/or in width.

As shown in FIG. 1, the base plate 8 comprises a deformation control member 40 in the form of a track extending along the periphery of the guiding surface 14 of the base plate 8. The deformation control member 40 is arranged to counteract radially inward deformation of the circumferential edge portion 25 of the second plunger skirt 10. The track is open radially outward, to permit the circumferential edge portion 25 of the second plunger skirt 10 to expand and move radially outward. The radially inner side of the track is constituted by a wall which prevents the circumferential edge portion of the second plunger skirt to be pressed radially inward. Thus, the circumferential edge portion 25 of the second plunger skirt 10 rests on a surface which is placed somewhat below the guiding surface 14 of the base plate 8 when the expansible press plunger 2 is in the unexpanded rest position.

The second plunger skirt 10 comprises a sealing ridge 41 extending circumferentially on the outer surface 24 of the second plunger skirt side wall 22. In the example shown in FIG. 4, the sealing ridge 41 extends along the full circumference of the second plunger skirt side wall 10. Although such configuration is generally preferred as it produces a continuous seal along the circumference of the second plunger skirt, it is to be understood that intermittent sealing ridges and sealing ridges extending only along a part or parts of the circumference of the second plunger skirt may be used within the scope of the invention.

The second plunger skirt 10 also comprises a deformation tool 42 in the form of an elongated bulge which extends circumferentially on the second plunger skirt side wall 22 and protrudes radially outward from the outer surface 24 of the second plunger skirt side wall 22. In the second plunger skirt 10 shown in FIG. 4, the deformation tool 42 is formed by the circumferential edge portion 25 of the second plunger skirt side wall being a thickened portion of the plunger skirt side wall 22. Although the deformation tool 42 is shown in FIG. 4 to extend over all the circumference of the second plunger skirt 10, it is to be understood that it may extend only over a part or parts of the circumference of the second plunger skirt 10, that it may be placed in another location on the outer surface 24 of the plunger skirt side wall 22 and/or may have other shapes, as set out herein. The deformation tool 42 is used for deforming the material in a packaging container wall to produce features in the container wall which deviate from the original planar shape of the packaging material. The packaging material is usually a paper-based packaging material, such as a laminate having a substrate layer of carton and one or more additional layer such as plastic, aluminium foil etc., laminated to the substrate layer.

Figure 3:
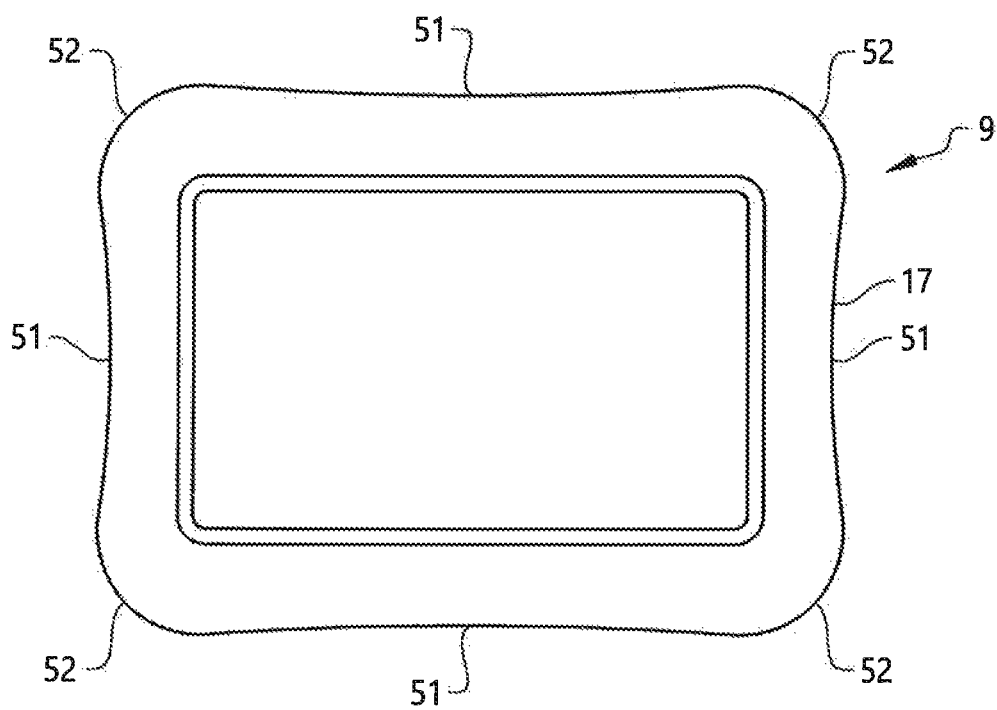
FIG. 3 shows a top view of the first plunger skirt shown in FIG. 2.

The circumferential edge portion 17 of the first plunger skirt 9 in the unexpanded state which is shown in FIG. 3 is divided into four side portions 51 being connected by corner portions 52 with each side portion 51 of the circumferential edge portion 17 of the first plunger skirt 9 being curved radially inwardly. When the first plunger skirt 9 in FIG. 3 is transferred to the expanded state, the inwardly curved side portions 51 are moved radially outward while at the same time being straightened out, implying that the difference between the shape of the circumferential edge portion 17 in the unexpanded and the expanded state is larger in the central part of each of the side portions 51 than in the vicinity of the corner portions 52. As set out herein, a shape of the circumferential edge portion 17 of the first plunger skirt 9 such as that which is shown in FIG. 3 is optional to the expansible press plunger as disclosed herein. Accordingly, the circumferential edge portion 17 of the first plunger skirt 9 may have any useful outline as disclosed herein.

The retaining device 4 of the attachment unit 1 shown in FIG. 1 comprises a welding unit 55 comprising an induction coil 56. The welding unit 55 is shown to be arranged such that it surrounds the positioning cavity 6 at a level corresponding to the position of the sealing ridge 41 on the second plunger skirt 10 when the expansible press plunger 2 is inserted into the positioning cavity 6 as shown in FIG. 1.

The positioning cavity 6 of the retaining device 4 comprises an indentation 57 which is arranged in a wall of the positioning cavity 6. The indentation 57 corresponds in shape and size to the deformation tool 42 on the second plunger skirt, the deformation tool 42 being arranged to nest inside the indentation 57 when the expansible press plunger 2 is in the attachment position.

As set out herein, the cross-sectional area of the positioning cavity 6 of the attachment unit 1 is adapted to the shape and size of the container body into which a container sealing element is to be introduced. The positioning cavity 6 of the attachment unit 1 which is shown in FIG. 1 is configured for attaching a container sealing element in a container having a modified rectangular cross-sectional shape and comprises side portions being connected by corner portions corresponding to the generally rectangular cross-sectional shape of the bottom surface 11 of the base plate 8 and the generally rectangular outline of the circumferential edge portion 17 of the first plunger skirt 9.

Regardless of the shape of the cross-sectional area of the positioning cavity 6 of the attachment unit 1, the cross-sectional area of the positioning cavity 6 of the attachment unit 1 is always larger than the cross-sectional area of the second plunger skirt 10 allowing the unexpanded press plunger 2 to be inserted into the positioning cavity 6 without damaging a container body which has been placed in the positioning cavity 6. The attachment unit shown in FIG. 1 may be used in a method for sealing a packaging container, the method comprising:

placing a container body 3 in the positioning cavity 6 of the retaining device 4 with a body wall of the container body 3 being aligned with a wall of the positioning cavity 6;

applying a container sealing element 29 to the bottom surface 11 of the base plate 8, the container sealing element 29 comprising an attachment border 28 extending radially outward of the circumferential edge 12 of the bottom surface 11. The container sealing element 29 may be held against the bottom surface 11 of the base plate 8 by means of vacuum suction;

moving the container sealing element 29 in the axial direction A of the attachment unit 1 to an attachment position within the container body 3 by means of the attachment unit 1 and simultaneously flexing the attachment border 28 of the container sealing element 29 into alignment with the body wall of the container body 3. The attachment border 28 of the container sealing element 29 will automatically be flexed upward in the axial direction as the attachment border 28 of the container sealing element 29 comes into contact with the edges of the positioning cavity 6 when the unexpanded press plunger 2 moves downward into the positioning cavity 6 and will be aligned with the body wall of the container body 3. The sealing element 29 is moved into the positioning cavity 6 and the container body 3 to a suitable depth for attaching the sealing element 29 to the container body wall;

transforming the first plunger skirt 9 to the radially expanded state by pressing the first plunger skirt 9 against the guiding surface 14 of the bottom plate 8, thereby causing the circumferential edge portion 17 of the first plunger skirt 9 to move radially outwardly and to exert radial pressure on an inner surface 23 of the second plunger skirt side wall 22, whereby the second plunger skirt 10 is transformed from the unexpanded state to the radially expanded state and the attachment border 28 of the container sealing element 29 is pressed by the radially expanded second plunger skirt 10 in a direction towards the body wall of the container body 3;

welding the attachment border 28 of the container sealing element 29 to the body wall of the container body 3 by pressing the attachment border 28 of the container sealing element 29 against the body wall of the container body 3 by means of the sealing ridge 41 extending circumferentially on the outer surface of the plunger skirt side wall 22 of the second plunger skirt 10, wherein welding the attachment border 28 of the container sealing element 29 to the body wall of the container body 3 is performed along the sealing ridge 41;

deforming the body wall of the container body 3 by radially pressing the deformation tool 42 into the indentation 57 in the wall of the positioning cavity 6 with the body wall of the container body 3 located between the deformation tool 42 on the second plunger skirt 10 and the indentation 57 in the wall of the positioning cavity 6.

Figure 5:
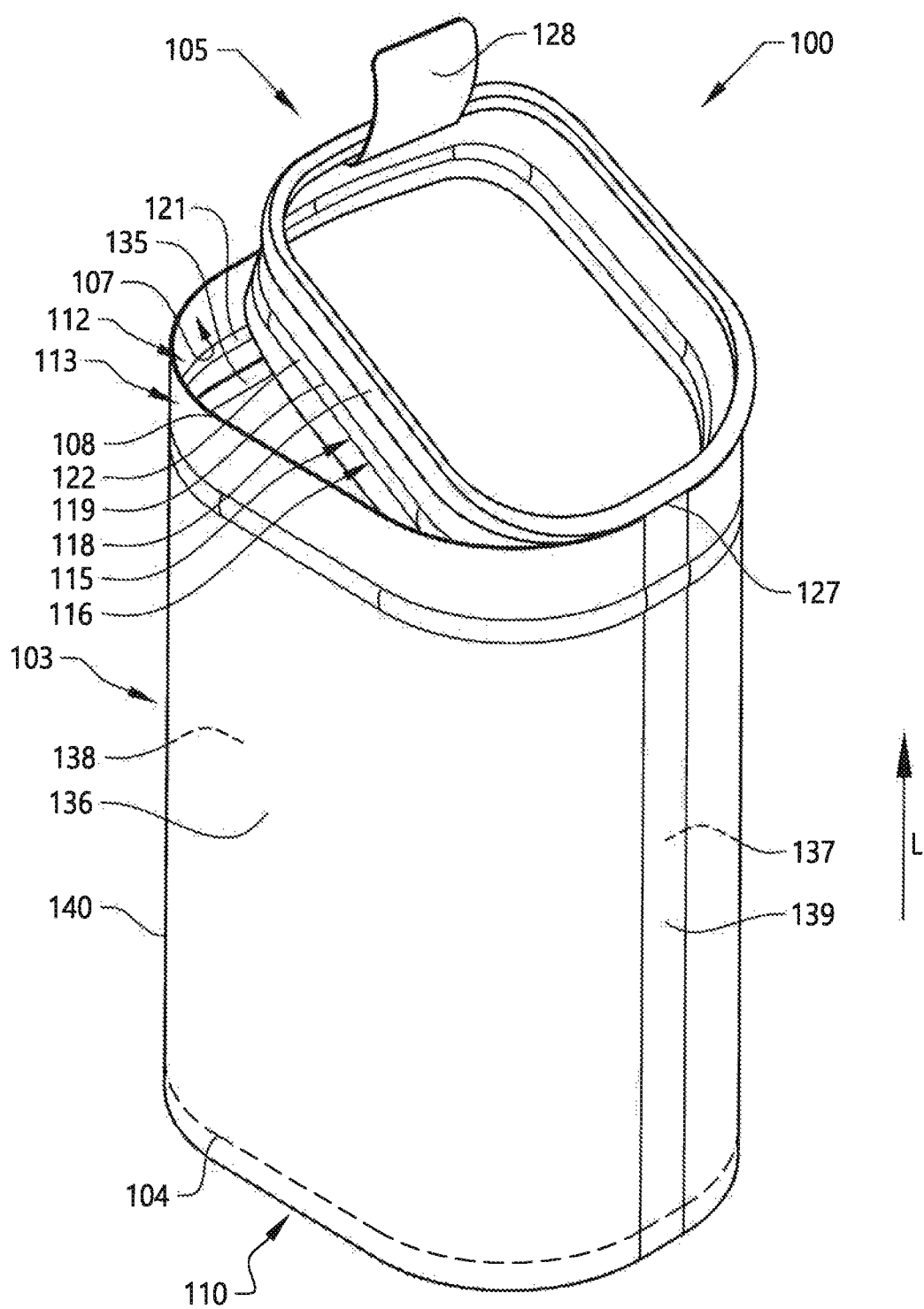
FIG. 5 shows a packaging container which can be made using the attachment unit in FIG. 1, the packaging container being shown in an open state.
Figure 6:
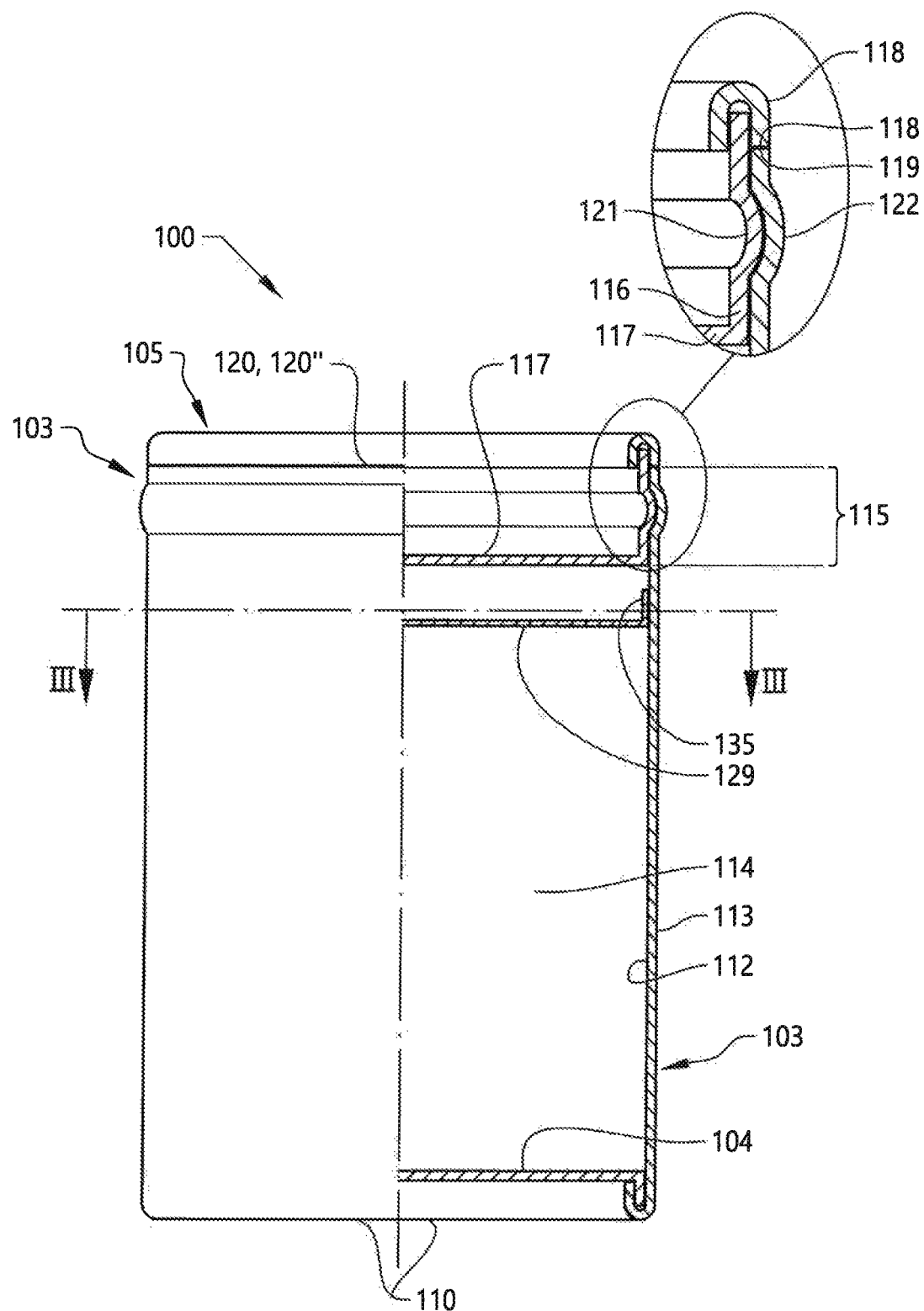
FIG. 6 shows the packaging container in FIG. 5 in a closed state with a part of FIG. 6 being a cross-sectional view.

The attachment unit 1 with the press plunger 2 as disclosed herein may be used when forming a paperboard packaging container 100 as shown in FIGS. 5 and 6.

FIG. 5 illustrates the paperboard packaging container 100 in an open position and FIG. 6 illustrates the paperboard packaging container 100 in a closed position wherein a part of FIG. 6 is a cross-sectional view.

The paperboard packaging container 100 comprises a tubular paperboard container body 103, a container bottom 104 and a container lid 105. The container body 103 extends in a longitudinal direction (L) of the container 100 from a bottom end 110 of the container body 103 to a container opening 107. The container body 103 comprises a container body abutment edge 108 at the container opening 107. The container body 103 has an inner surface 112 facing towards an inner compartment 114 in the packaging container 100 and an outer surface 113 facing away from the inner compartment 114.

In FIG. 5 a container body having a cuboid shape is depicted. The paperboard container has a front wall portion 136, a rear wall portion 137, side wall portions 138, 139 and curved corner portions 140 connecting the wall portions 136-137. The curved corner portions 140 have a radius of curvature of between 15 and 30 mm. As set out herein, the shape of the container body as shown in FIG. 5 constitutes only a non-limiting example and it is to be understood that the container body may have any useful shape, as set out herein.

The front and rear wall portions 136, 137 may be planar or may have an an outwardly curved shape with a radius of curvature of from 30-1000 mm. Likewise, the side wall portions 138, 139 may be substantially planar or may have a curvature, as desired.

The container lid 105 comprises an outer circumferential lid collar 118 having a lid abutment edge 119, which is adapted for abutting against the container body abutment edge 108, and a lid plug-in portion 115. The container lid 105 is also provided with a grip tab 128.

The plug-in portion 115 has a side surface 116 which extends in the longitudinal direction (L) and faces the inner surface 112 of the container body 103 when the container lid 105 is in a closed position. The plug-in portion 115 further comprises a main surface 117 being located at a distance from the container body abutment edge 108 when the container lid 105 is in a closed portion such that the plug-in portion 115 forms a plug extending downwards towards the container bottom 104.

The paperboard packaging container 100 is furthermore provided with a locking arrangement for retaining the container lid 105 in a closed position after closure of the lid 105. The locking arrangement which is shown in FIG. 6 comprises a first locking element 121 in the form of a recess, provided on the inner surface 112 of the container body 103, and a second locking element 122 in the form of a mating protrusion, provided on the side surface 116 of the lid plug-in portion 115. However, the first locking element 121 may alternatively be in the form of a protrusion and the second locking element 122 may be in the form of a recess, wherein the protrusion and the recess are matching such that the protrusion projects into the recess when the container lid 105 is in a closed position.

The first and second locking elements 121, 122 are arranged such that when the container lid 105 is in the closed position the protrusion is in engagement with the recess, i.e. the first locking element 121, provided on inner surface 112 of the container body 103, is provided with the same distance from the container body abutment edge 108 as the second locking element 122, provided on the side surface 116 of the plug-in portion 115, is provide from lid abutment edge 119.

The mating locking elements 121, 122 illustrated in FIGS. 5 and 6 are in the form of an elongated continuous protrusion and an elongated continuous recess provided along substantially 100% of the periphery of the inner surface 112 of the container body 103 and the side surface 116 of the plug-in portion 115, respectively. Alternatively, the locking elements may be provided only in one or more selected portions of the periphery of the inner surface 112 of the container body 103 and the side surface 116 of the plug-in portion 115.

The packaging container 100 may be provided with two or more of the locking arrangements, such that two or more of the first locking element 121 and two or more of the second locking element 122, being arranged in parallel, spaced apart in the longitudinal direction, continuously or discontinuously, along the periphery of the inner surface 112 of the container body 103 and along the periphery of the side surface 116 of the plug-in portion 115, respectively.

The container body abutment edge 108 and the lid abutment edge 119 in FIG. 5 are perpendicular to the wall of the container body 103 and have flat surfaces.

The container lid 105 is opened by pivoting the container lid about a hinge 127 provided between the container lid 105 and the container body 103. The hinge 127 is provided at one of the side wall portions. Alternatively, a hinge may be provided at one of the front or rear wall portions or the lid may be a fully separable lid which can be completely removed from the container body.

The lid collar in FIG. 6 is delimited from the container body by a slit 120' or by weakening means 120", extending along at least 55%, of the container body periphery for allowing the lid collar to be fully or partially separated from the container body at the abutment edges 108, 119. The non-separated part of the lid collar serves as a hinge between the lid and the container body.

In a packaging container 100 as disclosed herein, the lid 105 may be arranged to be completely removed when opening the container 100. When the container lid 105 is a completely removable lid, the container lid 105 is free from permanent connections to the container body 103. For the lid collar 118 and, thus, the container lid 105 to be fully separable from the container body, the slit 120' or the weakening means 120" should extend along 100% or substantially 100% of the container body 103 periphery.

The paperboard packaging container 100 shown in FIGS. 5 and 6 is provided with a partly removable transport closure 129 being attached to the inner surface 112 of the container body 103 at the transport closure peripheral flange 135. The transport closure 129 is removed by a user in order to gain initial access to the packaged content, leaving the peripheral flange 135 still attached to the inner surface 112 of the container body 103. The peripheral flange 135 acts as a reinforcement of the container opening 107 and stabilizes the shape of the container opening 107 such that the container 100 can be repeatedly opened and reclosed without the shape of the container opening 107 deteriorating over time. The stabilizing residual peripheral flange 135 contributes to maintaining a distinct closure even after the container 100 has been opened and closed multiple times. The transport closure 129 is provided at sufficient distance from a container body abutment edge 108 at said container opening 107 to allow the container lid 105 comprising the plug-in portion 115 to be in a closed position, meaning that this distance should be equal to or larger than the height of the plug-in portion 115.

As may be seen in FIG. 6 the container bottom 104 is in the form of a bottom disc provided in the bottom end 110, the bottom disc having a peripheral flange being flexed towards the bottom end 110 in the longitudinal direction (L). The attachment of the flange may be performed by gluing or welding, for instance with high frequency induction welding to the inner surface 112 of the container body 103. The bottom end edge is folded inwards over the bottom disc flange.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An expansible press plunger:
the expansible press plunger extending in an axial direction and in a radial direction perpendicular to the axial direction, the expansible press plunger being expansible in the radial direction, the expansible press plunger comprising:
a base plate;
a first plunger skirt,
wherein the base plate comprises a bottom surface with a circumferential edge defining a shape of the bottom surface and a guiding surface opposite the bottom surface, and
wherein the first plunger skirt comprises a top end, a bottom end, and a circumferential edge portion at the bottom end of the first plunger skirt, the circumferential edge portion of the first plunger skirt being arranged at the guiding surface of the base plate, the first plunger skirt being resiliently transformable between an unexpanded state and a radially expanded state; and
a second plunger skirt, wherein the second plunger skirt comprises a top end, a bottom end, and a plunger skirt side wall having an inner surface and an outer surface, the plunger skirt side wall extending from the top end to the bottom end of the second plunger skirt, the plunger skirt side wall comprising a circumferential edge portion at the bottom end of the second plunger skirt, the circumferential edge portion of the second plunger skirt being arranged radially outward of the circumferential edge portion of the first plunger skirt, the second plunger skirt being resiliently transformable between an unexpanded state and a radially expanded state;
wherein the first plunger skirt slides in a downward and outward direction on the guiding surface to bias the circumferential edge portion of the first plunger skirt against the inner surface of the plunger skirt side wall of the second plunger skirt when the second plunger skirt is transformed to the radially expanded state.

2. An expansible press plunger in accordance with claim 1, wherein the circumferential edge portion of the first plunger skirt abuts against the guiding surface of the base plate in the axial direction when the expansible press plunger is in an unexpanded state.

3. An expansible press plunger in accordance with claim 1, wherein the circumferential edge portion of the first plunger skirt is arranged above the guiding surface of the base plate in the axial direction when the expansible press plunger is in an unexpanded state.

4. An expansible press plunger in accordance with claim 1, wherein an expansion slit is arranged in the plunger skirt side wall of the second plunger skirt, the expansion slit extending in the plunger skirt side wall in the axial direction.

5. An expansible press plunger in accordance with claim 4, wherein the expansion slit terminates at the circumferential edge portion of the second plunger skirt without crossing the circumferential edge portion of the second plunger skirt.

6. An expansible press plunger in accordance with claim 4, wherein the second plunger skirt has a height in the axial direction, the expansion slit extending in the plunger skirt side wall a distance in a range of from 40% to 100% of the height of the second plunger skirt.

7. An expansible press plunger in accordance with claim 4, wherein the plunger skirt side wall of the second plunger skirt comprises a plurality of expansion slits being arranged in the plunger skirt side wall.

8. An expansible press plunger in accordance with claim 1, wherein the base plate comprises a deformation control member, the deformation control member being arranged to counteract radially inward deformation of the circumferential edge portion of the second plunger skirt.

9. An expansible press plunger in accordance with claim 8, wherein the deformation control member is provided in the form of a track arranged in the guiding surface of the base plate and the track being inset from the circumferential edge of the bottom surface of the base plate and extending along a periphery of the guiding surface of the base plate.

10. An expansible press plunger in accordance with claim 1, wherein the second plunger skirt comprises a sealing ridge extending circumferentially on the outer surface of the plunger skirt side wall of the second plunger skirt along all or part of a circumference of the plunger skirt side wall of the second plunger skirt.

11. An expansible press plunger in accordance with claim 1, wherein the second plunger skirt comprises a deformation tool, the deformation tool protruding radially from the outer surface of the plunger skirt side wall of the second plunger skirt.

12. An expansible press plunger in accordance with claim 11, wherein the deformation tool comprises an elongated bulge extending circumferentially on the plunger skirt side wall of the second plunger skirt, the elongated bulge extending over all or part of a circumference of the plunger skirt side wall of the second plunger skirt.

13. An expansible press plunger in accordance with claim 11, wherein the circumferential edge portion of the plunger skirt side wall of the second plunger skirt comprises the deformation tool.

14. An expansible press plunger according to claim 11, wherein a sealing ridge is arranged above the deformation tool as seen in a direction from the bottom end of the second plunger skirt towards the top end of the second plunger skirt.

15. An expansible press plunger according to claim 1, wherein the circumferential edge portion of the first plunger skirt comprises a first circumferential edge portion segment and a second circumferential edge portion segment, a radial distance between the circumferential edge portion of the first plunger skirt in the unexpanded state and the circumferential edge portion of the first plunger skirt in the expanded state being different for the first circumferential edge portion segment and the second circumferential edge portion segment.

16. An expansible press plunger according to claim 1, wherein the expansible press plunger comprises a first piston and a second piston, the first piston and the second piston extending in the axial direction with the second piston being coaxial with the first piston, the base plate being connected to the first piston with the bottom surface of the base plate extending perpendicular to the axial direction, the first plunger skirt being connected to the second piston and the second plunger skirt being connected to the first piston, the first piston and the second piston being arranged to be simultaneously movable in the axial direction as a unit and to be independently movable in relation to each other in the axial direction.

17. An attachment unit for attaching a container sealing element to a container body, the attachment unit comprising:
an expansible press plunger according to claim 1; and
a retaining device,
wherein the retaining device is adapted to retain the container body, the retaining device comprising at least one positioning cavity being adapted to receive and hold a portion of the container body, the at least one positioning cavity of the retaining device having a cross-sectional area defining a footprint area of the container body, the expansible press plunger being axially movable between an attachment position inside the at least one positioning cavity of the retaining device and a rest position outside the at least one positioning cavity of the retaining device.

18. An attachment unit according to claim 17, wherein the retaining device comprises a welding unit comprising an induction coil, wherein the welding unit is arranged around the at least one positioning cavity.

19. An attachment unit according to claim 17, wherein the at least one positioning cavity of the retaining device comprises an indentation being arranged in a wall of the at least one positioning cavity, the indentation corresponding to a deformation tool protruding radially from the outer surface of the plunger skirt side wall of the second plunger skirt, the deformation tool being arranged to nest inside the indentation when the expansible press plunger is in the attachment position.

20. A method for sealing a packaging container using the attachment unit of claim 17, the method comprising:
placing a container body in the at least one positioning cavity of the retaining device with a body wall of the container body being aligned with a wall of the at least one positioning cavity;
applying a container sealing element to the bottom surface of the base plate, the container sealing element comprising an attachment border extending radially outward of the circumferential edge of the bottom surface;
moving the container sealing element in the axial direction of the attachment unit to an attachment position within the container body by means of the attachment unit and simultaneously flexing the attachment border of the container sealing element into alignment with the body wall of the container body;
transforming the first plunger skirt to the radially expanded state by pressing the first plunger skirt against the guiding surface of the bottom plate, thereby causing the circumferential edge portion of the first plunger skirt to move radially outwardly and to exert radial pressure on the plunger skirt side wall of the second plunger skirt, whereby the second plunger skirt is transformed from the unexpanded state to the radially expanded state and the attachment border of the container sealing element is pressed by the radially expanded second plunger skirt in a direction towards the body wall of the container body; and
welding the attachment border of the container sealing element to the body wall of the container body.

21. A method according to claim 20, wherein the attachment border of the container sealing element is pressed against the body wall of the container body by a sealing ridge extending circumferentially on the outer surface of the plunger skirt side wall of the second plunger skirt along a full circumference of the plunger skirt side wall of the second plunger skirt, and wherein welding the attachment border of the container sealing element to the body wall of the container body is performed along the sealing ridge.

22. A method according to claim 20, wherein the second plunger skirt comprises a deformation tool protruding radially from the outer surface of the plunger skirt side wall, and the at least one positioning cavity of the retaining device comprises a corresponding indentation being arranged in the wall of the at least one positioning cavity, the method further comprising the step of deforming the body wall of the container body by radially pressing the deformation tool into the indentation in the wall of the at least one positioning cavity with the body wall of the container body located between the deformation tool on the second plunger skirt and the indentation in the wall of the at least one positioning cavity.

* * * * *